US012247292B2

(12) United States Patent
Parzefall

(10) Patent No.: US 12,247,292 B2
(45) Date of Patent: Mar. 11, 2025

(54) APPARATUS FOR ELECTROLESS METALLIZATION OF A TARGET SURFACE OF AT LEAST ONE WORKPIECE, AND METHOD AND DIFFUSER PLATE FOR THIS PURPOSE

(71) Applicant: AP&S INTERNATIONAL GMBH, Donaueschingen (DE)

(72) Inventor: Hubert Parzefall, Mintraching (DE)

(73) Assignee: AP & S INTERNATIONAL GMBH, Donaueschingen (DE)

( * ) Notice: Subject to any disclaimer, the term of this patent is extended or adjusted under 35 U.S.C. 154(b) by 39 days.

(21) Appl. No.: 17/783,850

(22) PCT Filed: Nov. 18, 2020

(86) PCT No.: PCT/EP2020/082594
§ 371 (c)(1),
(2) Date: Jun. 9, 2022

(87) PCT Pub. No.: WO2021/115746
PCT Pub. Date: Jun. 17, 2021

(65) Prior Publication Data

US 2023/0047104 A1 Feb. 16, 2023

(30) Foreign Application Priority Data

Dec. 12, 2019 (DE) ........................ 102019134116.7

(51) Int. Cl.
*C23C 18/16* (2006.01)
*B05C 3/00* (2006.01)
(Continued)

(52) U.S. Cl.
CPC .......... *C23C 18/1669* (2013.01); *B05C 3/005* (2013.01); *B05C 3/132* (2013.01);
(Continued)

(58) Field of Classification Search
USPC ..... 118/728, 729, 500, 428, 429; 156/345.1, 156/345.11
See application file for complete search history.

(56) References Cited

U.S. PATENT DOCUMENTS

2005/0160990 A1* 7/2005 Lubomirsky ..... H01L 21/68771 257/E21.174
2012/0000786 A1* 1/2012 Mayer .................... C25D 17/02 204/275.1
2012/0199475 A1 8/2012 McHugh et al.

FOREIGN PATENT DOCUMENTS

DE 102017128439 B3 5/2019
WO 2008/070568 A2 6/2008
WO WO-2019106137 A1 * 6/2019 ......... C23C 18/1628

OTHER PUBLICATIONS

English Translation WO-2019106137A1 (Year: 2019).*
Office Actions issued Sep. 2, 2020 and Apr. 29, 2022, in corresponding German application 10 2029 134 116.7.

* cited by examiner

*Primary Examiner* — Yewebdar T Tadesse
(74) *Attorney, Agent, or Firm* — Nath, Goldberg & Meyer; Jerald L. Meyer; Tanya E. Harkins

(57) ABSTRACT

The present invention relates to an apparatus (1) for the electroless metallization of a target surface of at least one workpiece (5), having a vessel (10) to accommodate a metallization solution having an inlet (15) and an outlet (16) for the metallization solution, and a holder (20) for accommodating the at least one workpiece (5) and can be arranged within the vessel (10), wherein at least one diffuser plate (30) is provided between the at least one inlet (15) and the holder (20) and has a multitude of diffuser openings (35) spaced apart in a plane of a plate (E), and wherein a movement device (40) is provided, which can move the diffuser plate (30) in at least one spatial direction in the
(Continued)

vessel (10). The present invention further relates to a method for the electroless metallization of the target surface of the at least one workpiece (5).

15 Claims, 2 Drawing Sheets

(51) Int. Cl.
*B05C 3/132* (2006.01)
*C23C 18/31* (2006.01)
(52) U.S. Cl.
CPC ........ *C23C 18/1628* (2013.01); *C23C 18/163* (2013.01); *C23C 18/31* (2013.01)

APPARATUS FOR ELECTROLESS METALLIZATION OF A TARGET SURFACE OF AT LEAST ONE WORKPIECE, AND METHOD AND DIFFUSER PLATE FOR THIS PURPOSE

This is a National Phase Application filed under 35 U.S.C. 371 as a national stage of PCT/EP2020/082594, filed Nov. 18, 2020, an application claiming the benefit of German Application No. 10 2019 134 116.7 filed Dec. 12, 2019, the content of each of which is hereby incorporated by reference in its entirety.

The present invention relates to an apparatus for the electroless metallization of a target surface of at least one workpiece for improving the homogeneity of a deposited metal layer of a workpiece.

Apparatuses and methods for the electroless metallization of a target surface of at least one workpiece are known from prior art in various embodiments. The electroless metal deposition from an electrolyte solution is generally known in semiconductor, solar or nanotechnology. The electroless metallization of objects, for example structured wafers, has clear advantages over galvanic metallization with respect to resistance, homogeneity, and the conformity of the deposition technology and properties of the achievable layers. It is advantageous that no apparatuses for electrical contacting are necessary for the workpieces to be coated. It is also possible to metallize a plurality of workpieces simultaneously in a so-called batch process, as a result of which the productivity of such apparatuses is considerably increased. It can also be mentioned as an advantage that no starting layer (seed layer) has to be provided on the workpiece by means of the purely chemical deposition process.

The process of electroless deposition of a metal layer requires a metallization solution with a reducing agent, a metal source, and a complexing agent, wherein—in addition to controlling the solution composition—parameters such as the PH value, the temperature, and the composition of the metal plating solution must be set with high accuracy, since the active initiation of a chemical reaction by means of a catalyst reacts extremely sensitively to the process temperature. The reactions can occur both autocatalytically and as an exchange or displacement reaction.

Typically, the operating temperature of the electroless electrolyte solution may be in a range close to the autocatalysis temperature for spontaneous self-decomposition of the metallization solution. The occurrence of a self-initiated decomposition of the electroless metallization solution leads to a metal deposition not only on desired areas of the target surfaces of the workpieces, but also on surfaces of the metallization plant, for example of the reactor cell, the electrolyte solution vessel, the supply lines, and the like. In pronounced cases of self-initiated decomposition, the total metal content of the electrolyte is essentially rapidly reduced to pure metal, which could potentially clog all lines, tubes, and the process basin. As a result, a great deal of effort is required in order to chemically combine the metallization solution, for example to remove the same with nitric acid and other chemicals, at the same time losing all of the expensive electrolyte components. In addition, toxic waste must also be disposed of as far as possible, which will also significantly contribute to the operating costs of an apparatus for electroless metallization.

In order to increase the achievable principle, the apparatuses for electroless metallization known from prior art are not designed as single-wafer systems, but for batch processes. In order to be able to process a plurality of wafers at the same time, these are introduced into holders, so-called carriers, into a basin in which the electrolyte solution is located. Typically, the wafers are perpendicular in the holders, the electrolyte solution being permanently reacted in the basin in order to ensure a uniform distribution of the reaction partners.

Typically, the electrolyte solution is introduced into the basin from below via a central inlet and can be removed at the top side and fed to recirculation and heating systems. Removal can be implemented, for example, via a simple overflow into an overflow basin.

In the case of the apparatuses known from prior art, the inlet for the electrolyte solution is arranged in the bottom of the vessel, the inlet being formed as a single inlet nozzle with an additional diffuser plate. This diffuser plate has flow-optimized inlet openings in the form of concentric circles.

In prior art it has been found to be disadvantageous that the layer thickness of the deposited metal varies across a wafer and there are also differences from wafer to wafer within a batch. These differences are justified, on the one hand, by a variation in the surface potential of the circuits on the wafer and by the hydrodynamic conditions in the process vessel, as a result of which the concentration of the reactants of the electrolyte solution varies across the surface of the target surfaces to be metallized with it. It has also been shown in this prior art that the inlet openings of the diffuser plates are blocked or throttled by gas bubbles.

This is where the present invention begins.

The object of the present invention is to propose an improved apparatus for the electroless metallization of workpieces, which expediently eliminates the disadvantages of the apparatuses known from prior art, which enables uniform layer deposition within a wafer and from wafer to wafer.

This object is solved by an apparatus for the electroless metallization of at least one workpiece.

Further advantageous embodiments of the present invention are specified in the dependent claims.

The apparatus according to the invention for electroless metallization of a target surface of at least one workpiece with the features of claim 1 has a vessel for receiving a metallization solution with an inlet for the metallization solution and an outlet for the metallization solution. In addition, the apparatus according to the invention has a holder for holding the at least one workpiece, which can be arranged in the vessel. According to the invention, it is provided that at least one diffuser plate is provided which has a plurality of diffuser openings spaced apart in a plane of a plate, and wherein a movement device is provided which can move the diffuser plate in at least one spatial direction in the vessel.

The invention is based on the idea that, by means of the movement of the diffuser plate, a movement is coupled into the reaction process, by which impoverishment of the metallization solution on its way from the inlet to the outlet is reduced and thus the homogeneity and conformity of the metal deposition can be increased. By means of the movement of the diffuser plate, an additional circulation of the metallization solution can take place in the vessel. The movement of the diffuser plate also prevents gas bubbles from possibly settling in the area of the diffuser openings of the diffuser plate, as a result of which diffuser openings are blocked. By means of the improved recirculation, an improved transport of the reactants on the target surface of the workpiece can be achieved.

In an advantageous manner, the inlet can be arranged on the bottom side and/or the outlet on the upper side. Several inlets and/or outlets can also be provided. In particular, a plurality of inlet lines can be arranged at a distance from one another on the vessel in order to supply the metallization solution distributed at a plurality of locations.

A further advantageous embodiment of the present invention provides that the diffuser plate is arranged between the at least one inlet of the vessel and the holder. By means of such an arrangement of the diffuser plate, the metallization solution flowing into the vessel from the inlet is thoroughly mixed and distributed homogeneously before the metallization solution can flow through the diffuser openings of the diffuser plate in the direction of the at least one workpiece.

It has also proved to be advantageous if the movement device can move the diffuser plate in at least one recurring or cyclic movement in and against one of the spatial directions perpendicularly to the plane of a plate. The diffuser plate is thus raised and lowered by the movement device, as a result of which, when the diffuser plate is lowered, the metallization solution is forced through the diffuser opening. As a result of this forced flow, so-called “jets” or rapids are formed on the side of the diffuser plate facing the outlet through the diffuser openings. In contrast, when the diffuser plate is raised, backflows are generated. The repeated formation of jets and backflows reduces a local impoverishment of the metallization solution on its way from the inlet to the outlet and increases the homogeneity and conformity of the metal deposition.

A further advantageous embodiment of the present invention ensures that the receptacle is movable in the vessel. In particular, it is preferred if the receptacle is arranged movably in the vessel in such a way that the receptacle follows the movement of the diffuser plate. The coupling of the movement of the diffuser plate and the receptacle prevents the distance between the diffuser plate and the receptacle from increasing or reducing during the movement of the diffuser plate, whereby the effect of movement and flushing through the metallization solution by the formed jets miss their effect.

Furthermore, according to the present invention, it can be ensured that the receptacle is arranged in a fixed position during the electroless metallization. In other words, the receptacle is not moved in the vessel in the event of agitation of the diffuser plate. It has been shown that, as a result, the metallization solution on the target surface is well exchanged and traced. The uniformity of the layer is improved and facilitates handling, since the fixed arrangement of the receptacle in the vessel reduces the stress for the workpieces or wafers.

Furthermore, it is advantageous if the receptacle is movable in the vessel by means of the movement device of the diffuser plate or by means of a further movement device. In particular, it is preferred if the receptacle is moved in at least two spatial directions by means of the movement device in the vessel. This movement is also referred to as agitation, wherein an agitation in at least two spatial directions enables an improved transport of the reactants on the target surface of the workpiece.

According to a further preferred embodiment of the present invention, the diffuser openings have a first cross-sectional area on a first side and a second cross-sectional area on a second side opposite the first side, wherein the first cross-sectional area is larger than the second cross-sectional area. In particular, it is preferred if the first side of the diffuser plate with the larger cross-sectional area is arranged in the vessel on the side facing the inlet and the second side of the diffuser plate on the side facing the receptacle. The diffuser openings can preferably be conical or cone-shaped with a cone section in order to minimize pressure losses and, depending on the flow direction, either as a nozzle or diffuser, accelerate or delay the metallization solution and to conduct the flow in an improved manner. The nozzle is used to form pronounced “jets” which both increase the degree of turbulence of the metallization solution in the basin and can penetrate far into a gap between two adjacent workpieces in the receptacle.

In particular, it has proven to be advantageous if the ratio between the first cross-sectional area and the second cross-sectional area is at least 1.1, with the ratio preferably being chosen to be greater than 1.1, for example 1.5, or even more preferably 2 or more.

Furthermore, it has proved to be advantageous if the diffuser openings are arranged perpendicularly to the plane of a plate of the diffuser plate. By means of the perpendicular arrangement of the diffuser openings to the plane of the plate, the jets can also penetrate into areas in the vessel far away from the diffuser plate.

A further advantageous embodiment of the present invention ensures that the diffuser openings are arranged in rows in the plane of a plate and the adjacent rows are arranged offset from one another. In particular, it has proven to be advantageous if the diffuser openings are arranged equidistantly at a first distance in the respective row and the offset between two adjacent rows corresponds to approximately half of the first distance. Furthermore, it has also proven to be advantageous if the second distance between two adjacent rows is smaller than the first distance, as a result of which a high density of diffuser openings can be realized. The rows may be arranged along a straight line or alternatively along one or more concentric circles. It should be noted that the arrangement of the diffuser openings in the plane of a plate can also take place on the basis of other criteria. For example, the arrangement of the diffuser openings in the plane of a plate can be preset by the at least one workpiece and/or the receptacle.

It has proven to be advantageous if the holder can accommodate several workpieces in rows by spacing each one by means of a gap and/or if the diffuser openings are arranged in such a way that they are aligned with the intermediate space or are directed into the space. The jets formed by the diffuser plate can thus flow around the workpieces particularly well without hitting an obstacle, and concentration impoverishment is also counteracted in the locations remote from the diffuser plate.

Furthermore, it has proved to be advantageous if the diffuser plate corresponds to the shape of the vessel. In particular, it is preferred if the diffuser plate is held movably mounted on a wall of the vessel in a piston-like manner with a running gap. The diffuser plate consequently divides the vessel into a first area, into which at least one inlet flows, and a second area, in which the holder can be arranged and has the outlet. The gap arranged between the diffuser plate and the vessel is preferably as small as possible in order to ensure that the metallization solution is completely forced through the diffuser openings of the diffuser plate. However, in the dimensioning of the gap, it should be taken into account that the gap is not too small in order to avoid greater pressure fluctuations in the first area, since such pressure fluctuations could damage both the vessel and the peripherals such as lines, pumps, or the like. A gap dimension of the gap can be a multiple of a thickness of the diffuser plate.

It has also proven to be advantageous if the diffuser plate has a frame which projects out from the plane of a plate of at least one of the sides of the diffuser plate. The frame is preferably arranged in a circumferential manner on the side of the diffuser plate facing the gap and increases the effective length of the gap between the diffuser plate and the wall, as a result of which gap flows are reduced.

The frame preferably has flow-conducting means through which the flow is guided in the direction of the diffuser openings when the diffuser plate is lowered.

A further aspect of the present invention relates to a method for the electroless metallization of a target surface of at least one workpiece with a previously presented apparatus, having the following method steps:

- inserting at least one workpiece into the receptacle;
- positioning the receptacle in the vessel filled with a metallization solution, through the inlet of which the metallization solution is fed into the vessel, preferably continuously, and through the process of which metallization solution is discharged, preferably continuously, from the vessel;
- rinsing the at least one workpiece with the metallization solution by moving the diffuser plate relative to the vessel by means of the jets formed by the diffuser openings in the metallization solution.

The core idea of the method according to the invention is based on the fact that, in the event of a movement of the diffuser plate in the vessel, the metallization solution is forced to form jets by means of the diffuser openings. The jets flow through the metallization solution in the vessel as completely as possible, as a result of which a homogeneous distribution of the reactive electrolyte components and a concomitant more homogeneous layer deposition can be achieved. At the same time, the metallization solution is mixed in the vessel on the side facing the inlet, whereby local concentration increases and/or concentration impoverishment can be avoided and the homogeneity of the metal deposition can be improved over a plurality of workpieces in a batch process.

According to a further advantageous implementation of the method according to the invention, it is ensured that the diffuser plate is moved cyclically by means of the movement device and that either jets exit alternately from the diffuser openings in the direction of the at least one workpiece or backflows enter into the diffuser openings. In the movement of the diffuser plate, gap flows between the diffuser plate and the wall of the vessel can also contribute to the mixing of the electrolyte solution.

Furthermore, it is advantageous to ensure that the holder with the at least one workpiece in the vessel is moved by means of the movement device, or that the holder with the at least one workpiece in the vessel is moved by a further movement device independently of the diffuser plate. It can be advantageous for the further movement device to move the holder with the at least one workpiece in the two directions of space perpendicularly to the direction of movement of the diffuser plate.

A further development of the method ensures that the holder with the at least one workpiece in the vessel is held firmly in a position when the diffuser plate is moved in the vessel. The holder with the at least one workpiece can be positioned so as to be mechanically decoupled from the diffuser plate in the vessel filled with the metallization solution and remain unchanged in this position until the intended metallization of the target surface of the workpiece has taken place and the holder with the least one workpiece is removed from the vessel.

Furthermore, it is advantageous if the diffuser plate is moved by the movement device for the formation of jets formed by the diffuser openings even if no holder is positioned in the vessel. In this so-called standby operation, a movement or agitation of the diffuser plate can lead to improved temperature control and temperature distribution in the vessel. In the event that a heater is provided in the vessel, the agitation of the diffuser plate both in production operation and in standby mode means that the heating is surrounded and reduces bubble formation on the heater or heater elements.

A third aspect of the present invention relates to a diffuser plate for the above-described apparatus and for use in the above-described method.

An embodiment according to the invention of an apparatus for the electroless metallization of a target surface of at least one workpiece and the associated method are described in detail below with reference to the accompanying drawings. In the drawings:

The same or functionally identical parts are identified with the same reference signs below. For the sake of clarity, not all the same or functionally identical parts are provided with a reference number in the individual figures.

FIG. 1 shows an apparatus 1 for the electroless metallization of a target surface of at least one workpiece 5. Such workpieces are wafers (not shown) which are commonly used as a substrate or base plate for electronic components, inter alia for integrated circuits (IC), micromechanical components, or photoelectric coatings.

Figure 1:
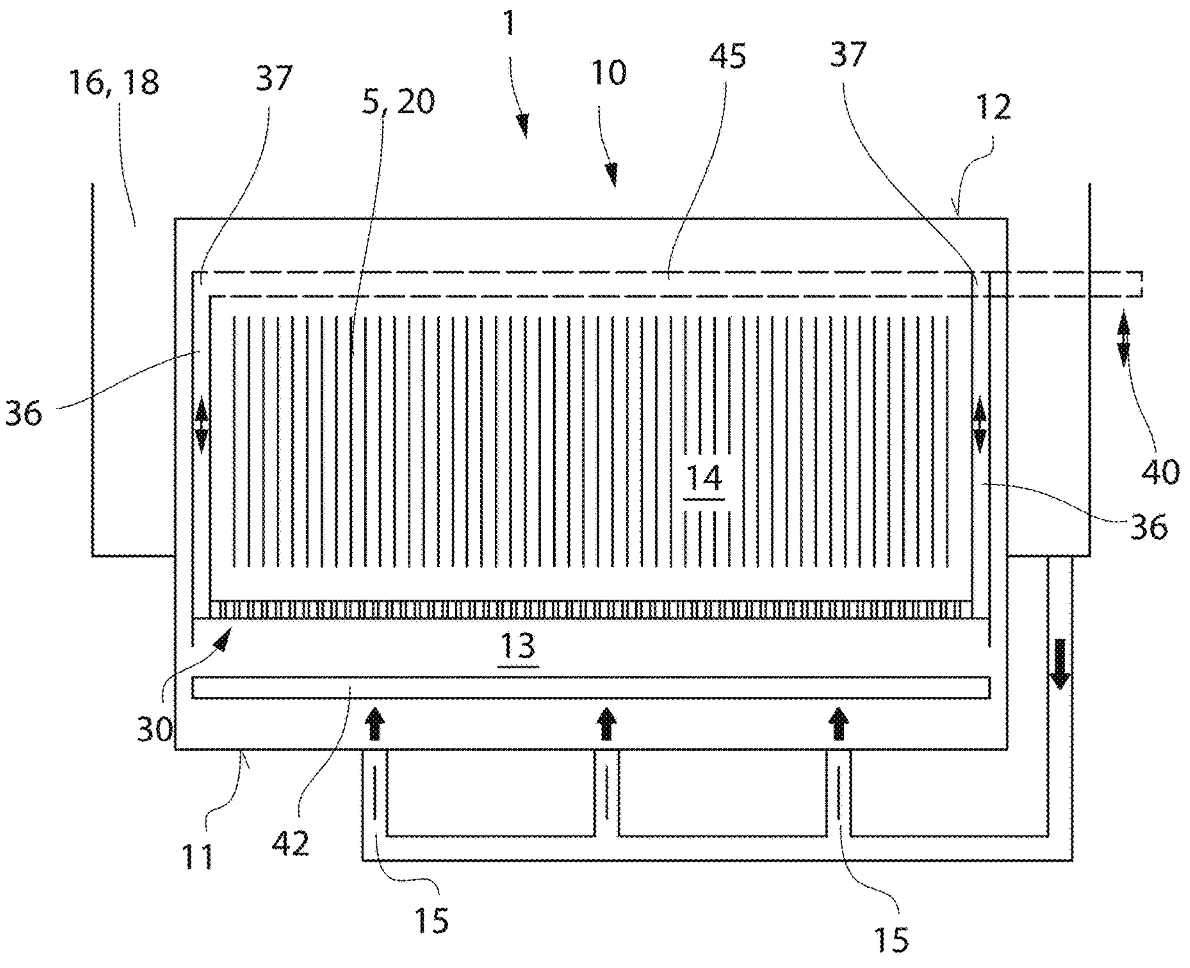
FIG. 1 shows a simplified and schematic representation of an apparatus according to the invention for electroless metallization of at least one workpiece with a vessel for receiving a metallization solution, in which vessel a diffuser plate is movably arranged.

The apparatus 1 essentially consists of a vessel 10 for receiving a metallization solution (not shown) into which the workpieces 5 can be immersed for metallization.

In the exemplary embodiment, a plurality of workpieces 5 are arranged in holders 20, which are designed as so-called wafer carriers, in a perpendicular and upright manner.

The vessel 10 has a bottom side 11 and a top side 12 and is formed by a liquidtight wall. While the top side 12 is essentially open, the remaining sides are closed, whereby the vessel 10 can receive the metallization solution. Furthermore, the vessel 10 has at least one inlet 15 and an outlet 16. A plurality of inlet lines 15 can preferably be provided, which are arranged in a distributed manner. Further preferably, the inlet 15 or the inlet lines 15 can be arranged on the bottom side. The outlet 16 is preferably arranged on the upper side, wherein the outlet 16 in the present case is designed as an overflow 18. The metallization solution can be continuously fed into the vessel 10 by means of the inlet 15, during which the outlet 16 is designed for preferably continuous removal of the metallization solution, as a result of which the metallization solution flows through the vessel from the inlet 15 to the outlet 16. In order to catch the metallization solution emerging through the overflow, the vessel 10 is arranged in an overflow vessel which surrounds the vessel 10. Like the vessel 10 itself, the overflow vessel is only shown schematically.

A diffuser plate 30 can be arranged in the vessel 10. The diffuser plate 30 can be a substantially planar plate which has a plane of a plate E which corresponds to the normal plane of the diffuser plate 30. The diffuser plate 30 has a first side 31 and a second side 32, the first side 31 facing the bottom 11 of the vessel 10 and the second side 32 the top side 12 of the vessel 10.

The diffuser plate 30 is movably arranged in the vessel 10 and can preferably be lifted and lowered between the bottom side 11 and the top side 12 in a direction parallel to a normal vector of the plane of a plate E, which preferably points in the vertical direction. To this end, the shape of the diffuser plate 30 is adapted to the shape of the vessel 10 and there is a gap or running gap formed between the diffuser plate 30 and the vessel 10.

The diffuser plate 30 divides the vessel 10 into a first area 13 and a second area 14, wherein the first area 13 includes a plenum between the bottom side 11 of the vessel 10 and the first side 31 of the diffuser plate 30 and the second area 14 comprises the area of the vessel 10, which extends from the second side 32 of the diffuser plate 30 to the upper side 12.

In the first area 13, a heater 42 can be arranged between the diffuser plate 30 and the inlet 15, which can be formed from a plurality of heating elements, which can be arranged in a stationary manner in the vessel 10 parallel to the diffuser plate 30. The heater 42 can regulate the temperature of the metallization solution in the vessel.

Figure 2:
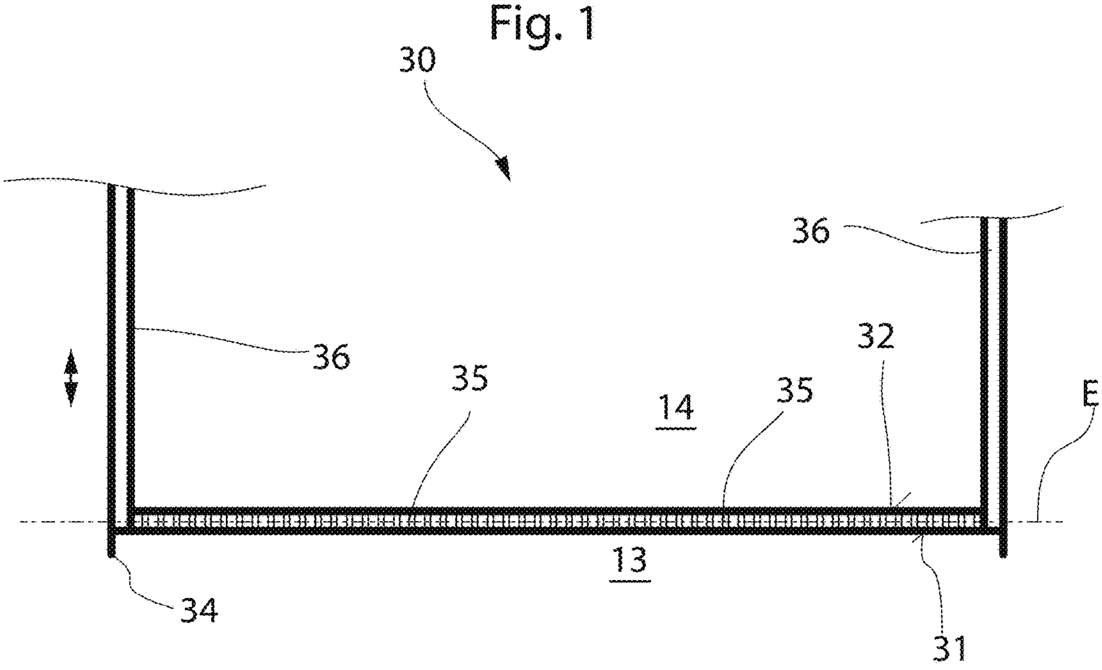
FIG. 2 shows an enlarged and schematic representation of the diffuser plate according to FIG. 1.
Figure 3:
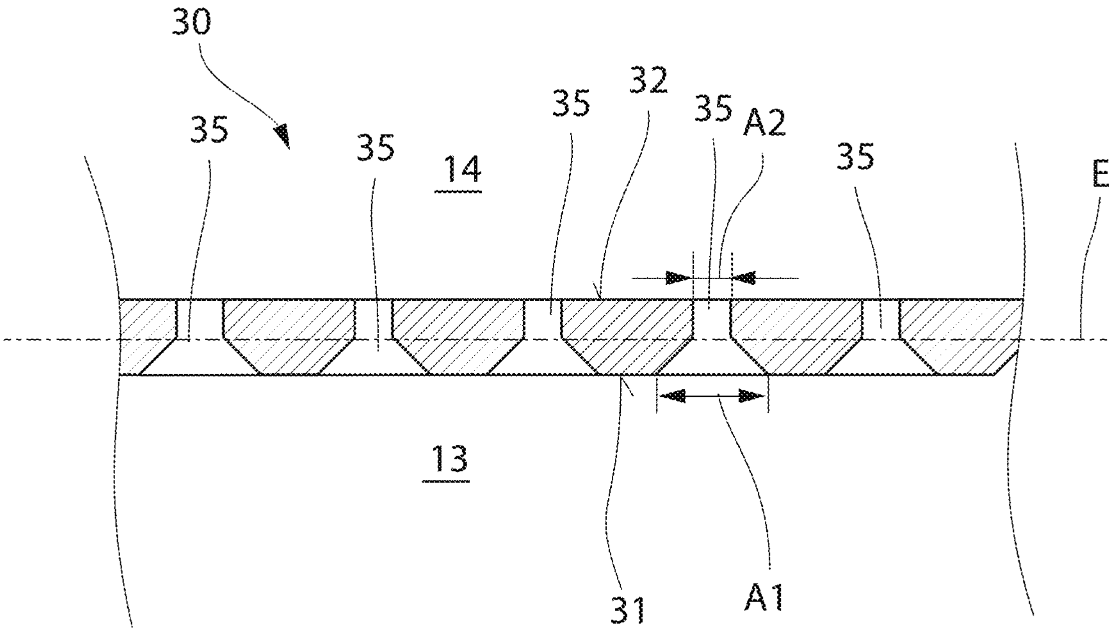
FIG. 3 shows a schematic detail of the diffuser plate according to FIGS. 1 and 2.

As can be seen from FIGS. 2 and 3, the diffuser plate 30 has a plurality of diffuser openings 35. The respective diffuser opening 35 completely breaks through the diffuser plate 30 and connects the first side 31 to the second side 32.

The diffuser openings 35 can—as in the illustrated embodiment—be arranged in a plurality of rows, which are arranged parallel and spaced apart from one another. In the respective row, the diffuser openings 35 are arranged at a first distance D1, preferably equidistantly along a straight line or in one or more concentric circles, so as to be spaced apart from one another. Adjacent rows run at a second distance D2. The second distance D2 is preferably smaller than the first distance D1 in order to achieve the highest possible density of diffuser openings 35 on the diffuser plate 30.

FIGS. 2 and 3 also show that the diffuser openings 35 on the first side 31 and the second side 32 have different cross-sectional areas A1, A2. On the first side 31, the diffuser opening 35 has a first cross-sectional area A1 and on the second side 32, the diffuser opening 35 has a second cross-sectional area A2, wherein the first cross-sectional area A1 is preferably greater than the second cross-sectional area A2. The diffuser opening 35 can thus have a cone section through which the diffuser opening 35 has a cross-sectional taper between the first side 31 and the second side 32.

On the first side 31, a frame 34, which is formed in a circumferential manner along the side edge of the diffuser plate 30, protrudes from the plane of a plate E. As shown in FIG. 2, the frame 34 stands free from the first side 31 in the direction of the bottom side 11 and can have a chamfer designed as a flow conduction center, which can be arranged on the side facing away from the gap and by means of which the surface enclosed by the frame 34 is widened in the direction of the bottom side 11.

Furthermore, it can be seen from FIG. 2 that the diffuser plate 30 has holding means 36, through which the diffuser plate 30 is placed in the vessel 10 or can be immersed in the metallization solution. The holding means 36 comprise fastening means 37 on the side facing away from the diffuser plate 30.

The holding means 36 make it possible to immerse or submerge the diffuser plate 30 into the vessel 10. The holding means 36 are preferably designed in such a way that the fastening means 37 protrude from the top side 12 of the vessel 10 in the lowered state of the diffuser plate 30.

The apparatus 1 also has a movement device 40, which is arranged laterally next to the pool 10 in FIG. 1. The movement device 40 is connected via an agitation frame 45 to the fastening means 37 at the free end of the holding means 36. The movement device 40 can have a drive designed as desired, which can generate a movement that can be transmitted to the diffuser plate 30 by means of the agitation frame 45, the fastening means 37, and the holding means 36.

Preferably, the movement device 40 can raise and lower the diffuser plate 30 in the vessel 10, wherein, when the diffuser plate 30 is lowered, the diffuser plate 30 is moved in the direction of the bottom side 11 and the diffuser plate 30 is moved in the direction of the top side 12 when it is raised.

When the diffuser plate 30 is lowered, the metallization solution enclosed in the first area 13 is forced into the diffuser openings 35 and exits on the second side 32 from the respective diffuser opening 35 in a rapid, a so-called "jet", which subsequently spreads out in the second area 14. When the diffuser plate 30 is raised, the metallization solution flows from the second area 14 in the direction of the first area 13, wherein the metallization solution that has flowed back is mixed in the first area 13 with the metallization solution supplied by the inlet 15. In this case, the heating 42 is surrounded by a flow, as a result of which the formation of bubbles at the heater 42 can be reduced and a homogeneous temperature distribution can be realized.

The larger cross-sectional areas A1 of the diffuser openings 35 on the first side 31 lead the metallization solution in the manner of a nozzle in the direction of the second side 32, and when the diffuser plate 30 is lowered, gas bubbles are easily forced through the diffuser openings 35.

The movement device 40 can preferably lift and lower the diffuser plate 30 cyclically, as a result of which jets and backflows are formed alternately, which flush through the second area 14 of the vessel 10 and the metallization solution located there is thoroughly mixed. As a result, a local impoverishment of the metallization solution in the second area 14 is counteracted.

The holder 20 can be immersed through the open top side 12 in the metallization solution in the vessel 10. As can be seen from FIG. 1, the holder 20 is positioned on the side of the diffuser plate 30 facing the upper side 12 in the metallization solution in the vessel 10.

The holder 20 with the at least one workpiece 5 can be arranged on the side of the diffuser plate 30 facing the upper side 12 and positions the at least one workpiece 5 in such a way that the workpiece 5 is surrounded by the jets formed by the movement of the diffuser plate 30.

The holder 20 can follow a lowering and a lifting of the diffuser plate 30, which is why the distance between the at least one workpiece 5 and the diffuser plate 30 is constant during the electroless metallization of the workpiece 5. Alternatively, the holder 20 can be arranged in a stationary manner in the vessel 10 and the distance between the diffuser plate 30 and the holder 20 can be varied.

In order to electrolessly metallize a target surface of the at least one workpiece 5, the at least one workpiece 5 is first inserted into the holder 20. After the insertion of the at least one workpiece 5 into the holder 20, the holder 20 is positioned in the vessel 10 filled with a metallization solution, so that the workpieces 5 or the target surfaces of the workpieces 5 are completely lowered or lowered into the metallization solution or are completely surrounded by the metallization solution. As soon as the holder 20 is completely lowered into the metallization solution in the vessel 10, the at least one workpiece 5 is surrounded by the metallization solution by moving the diffuser plate 30 by means of the movement device 40 through the jets formed by the diffuser openings 35. In this case, it is also advantageous if, during the moving of the diffuser plate 30, the metallization solution is continuously fed through the inlet 15 into the vessel 10 and is equally discharged through the outlet 16. The flow rate through the inlet 15 is preferably about 5-20 l/min.

The diffuser plate 30 is preferably cyclically raised and lowered by the movement device 40, as a result of which jets exit repeatedly from the diffuser openings 35. The raising and lowering can be described as a sinusoidal or cyclic motion of approximately 20 periods, wherein the amplitude or the stroke of the diffuser plate 30 is about 30 mm. The jets mix the metallization solution in the second area 14 of the vessel 10 with the at least one workpiece 5, as a result of which a mixing of the metallization solution in this second area 14 counteracts a local impoverishment of the reactants of the metallization solution and the uniformity or layer thickness distribution on the target surface is improved.

List of reference numerals

| | |
|---|---|
| 1 | Apparatus |
| 5 | Workpiece |
| 10 | Vessel |
| 11 | Floor area |
| 12 | Top side area |
| 13 | First area |
| 14 | Second area |
| 15 | Inlet |
| 16 | Outlet |
| 18 | Overflow |
| 20 | Holder |
| 30 | Diffuser plate |
| 31 | First side |
| 32 | Second side |
| 34 | Frame |
| 35 | Diffuser opening |
| 36 | Holding agent |
| 37 | Fastening means |
| 40 | Movement device |
| 42 | Heater |
| 45 | Agitation frame |
| E | Plane of a plate |

The invention claimed is:

1. An apparatus (1) for the electroless metallization of a target surface of a plurality of workpieces (5), comprising:

a vessel (10) for receiving a metallization solution with an inlet (15) and an outlet (16) for the metallization solution, and a holder (20) for holding the plurality of workpieces (5), which can be arranged in the vessel (10), wherein a diffuser plate (30) is provided between the at least one inlet (15) and the holder (20), which has a plurality of diffuser openings (35) spaced apart in a plane of a plate (E), wherein a movement device (40) is provided, which can move the diffuser plate (30) in at least one direction in space in the vessel (10), wherein a first diffuser opening (35), from among the plurality of diffuser openings (35), has:

a first cross-sectional area (A1) on a first side (31) of the diffuser plate (30), and a second cross-sectional area (A2) on a second side (32) of the diffuser plate (30), opposite to the first side (31) thereof, wherein the first cross-sectional area (A1) is greater than the second cross-sectional area (A2), wherein the second side (32) of the diffuser plate (30) faces the plurality of workpieces (5), wherein the first diffuser opening (35) is conical or cone-shaped, wherein the diffuser plate (30) is movable in a direction parallel to a normal vector of the plane of a plate (E), and wherein the holder (20) is connected to the movement device (40).

2. The apparatus (1) according to claim 1, characterized in that the movement device (40) has the diffuser plate (30) in at least one recurring movement in one of the spatial directions perpendicular to the plane of a plate (E).

3. The apparatus (1) according to claim 1, characterized in that the holder (20) is movable in the vessel (10).

4. The apparatus (1) according to claim 1, characterized in that the holder (20) is configured to be moved by the movement device (40) or the holder (20) is fixedly arranged in the vessel (10).

5. The apparatus (1) according to claim 1, characterized in that a ratio between the first cross-sectional area (A1) and the second cross-sectional area (A2) is at least 1.1, i.e. A1/A2≥1.1.

6. The apparatus (1) according to claim 1, characterized in that the plurality of diffuser openings (35) are aligned in the at least one spatial direction.

7. The apparatus according to claim 1, characterized in that the plurality of diffuser openings (35) are arranged in rows in the plane of a plate (E) and that adjacent rows are arranged so as to be offset to one another.

8. The apparatus according to claim 1, characterized in that the holder (20) can accommodate several workpieces (5) spaced apart in rows by gaps and/or that the plurality of diffuser openings (35) are directed into the gaps.

9. The apparatus (1) according to claim 1, characterized in that the diffuser plate (30) corresponds to the shape of the vessel (10).

10. The apparatus (1) according to claim 1, characterized in that the diffuser plate (30) has a frame (34), which projects out from the plane of a plate (E) of at least one of the first and second sides (31, 32).

11. The apparatus (1) according to claim 10, characterized in that the frame (34) has flow means through which the metallization solution can be guided in the direction of the plurality of diffuser openings (35).

12. A method for the electroless metallization of a target surface of at least one workpiece (5), in particular with an apparatus (1) according to claim 1, comprising the following method steps:

inserting at least one workpiece (5) into the holder (20), positioning the holder (20) in the vessel filled with a metallization solution, and flushing the at least one workpiece (5) with the metallization solution by moving the diffuser plate (30) in order to form jets formed by the diffuser openings (35) in the metallization solution.

13. The method according to claim 12, characterized in that the diffuser plate (30) is cyclically moved by the movement device (40) and that the jets exit alternately from the diffuser openings (35) and are generated by backflows flowing into the diffuser openings (35).

14. The method according to claim 12, characterized in that the holder (20) with the least one workpiece (5) in the vessel (10) is moved by the movement device (40) or that the holder (20) is moved with the least one workpiece (5) in the vessel (10) by a further movement device independently of the diffuser plate (30).

15. A diffuser plate (30) for the apparatus (1) according to claim 1.

* * * * *